United States Patent
Margines (10) Patent No.: US 12,005,926 B2
(45) Date of Patent: Jun. 11, 2024

(54) TRAFFIC LIGHT VIEWSHEDS

(71) Applicant: Waymo LLC, Mountain View, CA (US)

(72) Inventor: David Yonchar Margines, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 58 days.

(21) Appl. No.: 17/536,909

(22) Filed: Nov. 29, 2021

(65) Prior Publication Data

US 2022/0204032 A1 Jun. 30, 2022

Related U.S. Application Data

(60) Provisional application No. 63/132,978, filed on Dec. 31, 2020.

(51) Int. Cl.
| | |
|---|---|
| *B60W 60/00* | (2020.01) |
| *B60W 30/18* | (2012.01) |
| *B60W 40/04* | (2006.01) |
| *G06V 20/58* | (2022.01) |

(52) U.S. Cl.
CPC .. *B60W 60/0011* (2020.02); *B60W 30/18154* (2013.01); *B60W 40/04* (2013.01); *G06V 20/584* (2022.01)

(58) Field of Classification Search
CPC ............ B60W 30/18154; B60W 40/04; G06V 20/584
See application file for complete search history.

(56) References Cited

U.S. PATENT DOCUMENTS

| | | | | |
|---|---|---|---|---|
| 8,712,624 | B1 * | 4/2014 | Ferguson | B60W 30/18159 |
| | | | | 701/25 |
| 9,779,314 | B1 * | 10/2017 | Wendel | G06V 30/194 |
| 2013/0245877 | A1 * | 9/2013 | Ferguson | G08G 1/167 |
| | | | | 701/23 |
| 2018/0095466 | A1 * | 4/2018 | Allan | B60W 60/00253 |
| 2020/0225669 | A1 * | 7/2020 | Silva | B60W 60/0011 |
| 2021/0211568 | A1 * | 7/2021 | Zhou | G06V 10/25 |
| 2022/0402492 | A1 * | 12/2022 | Sakakura | B60W 30/16 |

FOREIGN PATENT DOCUMENTS

WO WO-2020243484 A1 * 12/2020 .......... B60W 30/146

* cited by examiner

*Primary Examiner* — Khoi H Tran
*Assistant Examiner* — Tristan J Greiner
(74) *Attorney, Agent, or Firm* — Fish & Richardson P.C.

(57) ABSTRACT

Methods, systems, and apparatus, including computer programs encoded on computer storage media, for using traffic light viewsheds. One of the methods includes obtaining, by an on-board computer system of vehicle, viewshed data comprising a plurality of viewsheds for a plurality of respective traffic lights. An indication of a candidate driving plan that uses input from a traffic light detection of a particular traffic light having a viewshed is received. If a current location of the vehicle is within the particular viewshed for the particular traffic light, execution of the candidate driving plan is conditioned based on whether the current location of the vehicle is within the particular viewshed for the particular traffic light.

18 Claims, 5 Drawing Sheets

TRAFFIC LIGHT VIEWSHEDS

CROSS-REFERENCE TO RELATED APPLICATION

This application claims priority to U.S. Provisional Application No. 63/132,978, filed on Dec. 31, 2020. The disclosure of the prior application is herein incorporated by reference.

BACKGROUND

This specification relates to automatic planning of autonomous vehicle driving decisions.

Autonomous vehicles include self-driving cars, boats, and aircraft. Autonomous vehicles use a variety of on-board sensors in tandem with map representations of the environment in order to make control and navigation decisions. A critical aspect of self-driving vehicle navigation is accurate detection of traffic lights. Traffic lights can be detected by cameras or by lidar or other sensors. However, it is yet another problem to determine which traffic lights control which lanes because it is common for multiple traffic lights to be visible from the same lane.

SUMMARY

This specification describes how a vehicle, e.g., an autonomous or semi-autonomous vehicle, can use traffic light viewsheds to make driving decisions. In this specification a viewshed is a volume within which a traffic light is expected to be visible according to previously recorded detection data. For example, a viewshed for a traffic light can be defined by a volume that contains locations from which detections of the traffic light had a particular threshold strength. Viewsheds are typically conically shaped for traffic lights that don't have any obstructions. However, viewsheds can also have semi-conical shapes when traffic lights have obstructions including lourvering or other mechanisms to control from where they should be visible.

Where a viewshed intersects the surface of a roadway, it typically makes a two-dimensional area that is ovular shaped. In this specification the two-dimensional area where a viewshed intersects a road surface will be referred to as a viewshed area. When a sensor is located within a viewshed, the sensor is expected to be able to observe traffic lights for the viewshed.

This specification describes techniques for associating viewsheds with locations to which vehicles can travel and how to use such associated viewsheds to make automatic driving decisions. In this specification, a viewshed for a traffic light being associated with a location, e.g., a particular portion of a traffic lane or another area where vehicles might drive, means that when a vehicle travels through or near the location, the traffic light is expected to be visible when the vehicle, or one or more sensors on the vehicle, are within the viewshed.

Particular embodiments of the subject matter described in this specification can be implemented so as to realize one or more of the following advantages. Using viewsheds to associate traffic lights to lanes enhances the accuracy and safety of autonomous driving systems. Furthermore, the process can be partially or fully automated with automatically generated viewshed areas being automatically associated with traffic lights. Viewshed volumes and viewshed areas can be used for a number of different self-driving vehicle applications. For example a viewshed can be used as evidence as to whether a traffic light should be associated with a particular lane or not. This can be particularly useful at irregular intersections where it may not be clear from the position and orientation of the traffic lights alone which traffic lights are visible from which lanes. A viewshed can also be used to determine when a vehicle should be able to rely on a traffic light, which can eliminate false positive and false negative detections.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use traffic light viewsheds to make autonomous driving decisions.

Figure 1:
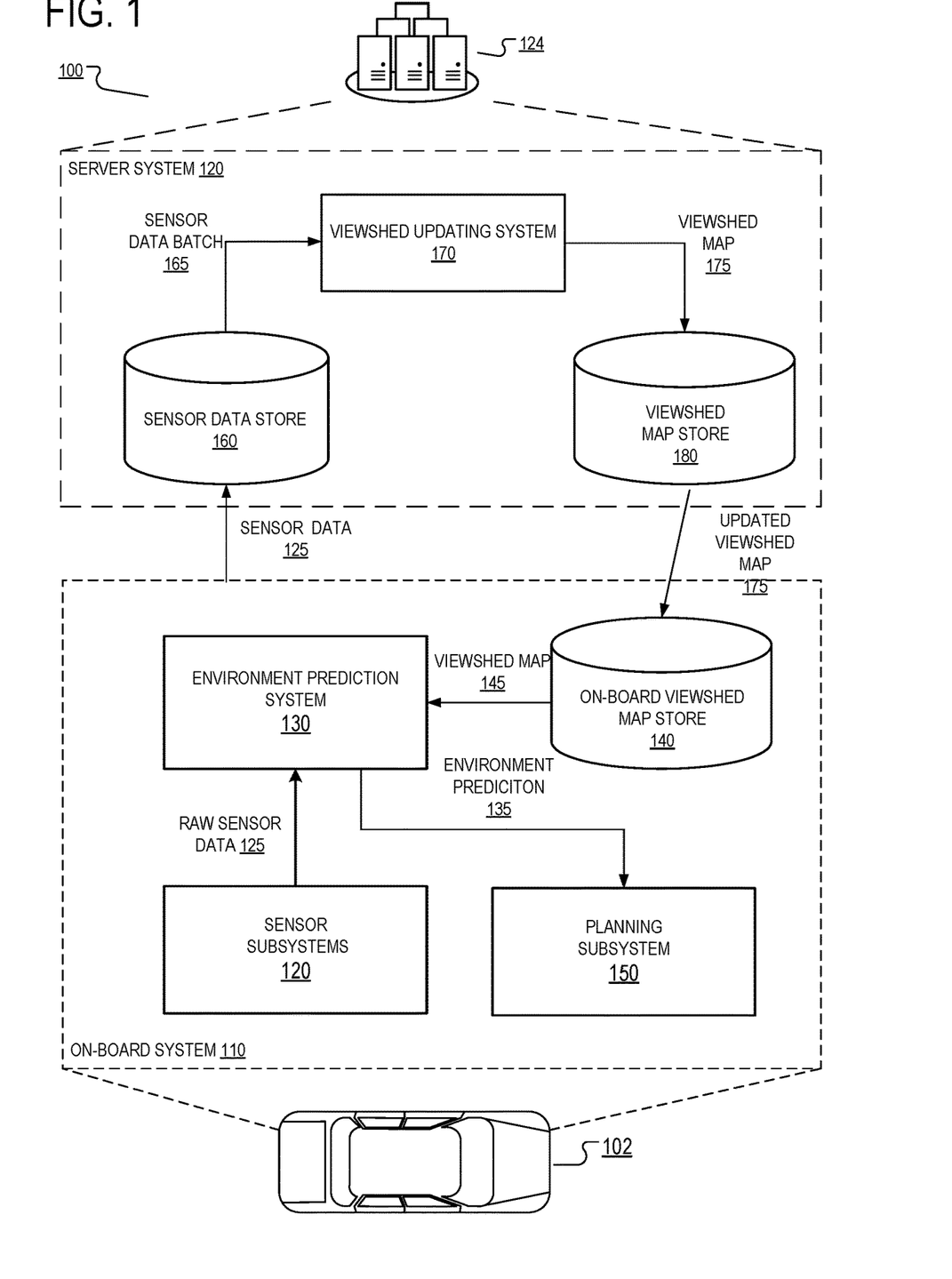
FIG. 1 is a diagram of an example system.

FIG. 1 is a diagram of an example system 100. The system 100 is an example of a system that can use traffic light viewsheds to aid self-driving vehicle driving decisions.

The system 100 can include multiple vehicles, each with a respective on-board system. For simplicity, a single vehicle 102 and its on-board system 110 is depicted in FIG. 1. The system 100 also includes a server system 120, which multiple other vehicles in the system 100 can access to obtain data for operation in real-world driving environments.

The vehicle 102 in FIG. 1 is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with an object in the environment, e.g., an object or another vehicle. The on-board system 110 includes one or more sensor subsystems 120. The sensor subsystems 120 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 120 or other components of the vehicle 102 can also classify groups of one or more raw sensor measurements from one or more sensors as being measures of an object of a particular type. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

The sensor subsystems 120 can compile the raw sensor measurements into a set of raw sensor data 125, and send the raw data 125 to an environment prediction system 130. The environment prediction system 130 can use the raw sensor data 125 to make predictions about various objects in the environment.

For example, the environment prediction system 130 can determine that some of the detections are traffic lights. This determination can be based on vision algorithms that recognize the size and shape of traffic lights as well as color data from cameras and point cloud data from lidar sensors, or some combination of these. The environment prediction system 130 can also record a location that the vehicle 102 is at when the traffic light was detected. The environment prediction system 130 can also record when a traffic light is no longer detected.

The on-board system 110 can then provide this information as sensor data 125 to the server system 120. In other words the sensor data 125 includes data representing traffic light detections as well as where the traffic light detections first occurred and where the traffic lights were no longer detected. The sensor data 125 can also include raw sensor data including camera images and lidar point clouds.

The server system 120 is typically hosted within a data center 124, which can be a distributed computing system having hundreds or thousands of computers in one or more locations.

The server system 120 includes a sensor data store 160 that stores sensor data generated by respective vehicles navigating through the real world. As each vehicle captures new sensor data characterizing locations in the real world, each vehicle can provide the sensor data to the server system 120.

The viewshed updating system 170 can then process batches of sensor data 165 to generate viewshed maps. In the specification, a viewshed map is a collection of data that records the parameters of viewsheds. The viewshed data can have any appropriate representation. For example, the viewshed map can record the sizes, shapes, or explicit boundaries of viewshed areas, or viewshed volumes as well as which traffic light detections were responsible for generating those viewsheds. In some implementations, the viewshed maps can also have data representing the three-dimensional viewshed volume itself. However this information can be deduced from the viewshed map, the traffic light detections used to generate the viewshed map, and a location of the corresponding traffic light, and thus need not be represented explicitly.

Viewsheds generated by the viewshed updating system 170 can have an associated strength. The strength can be based on a number of factors. One factor might be how many vehicle passes detected the traffic light from a particular lane. Another factor can be a measure of the relative strength of detection for the sensor that detects the traffic light as compared to an expected strength for traffic lights generally. Another factor can be a strength of the preceding factors in the context of different environmental factors associated with the detection(s), for instance day or night, the weather, or the position of the sun relative to the vehicle and/or the traffic light. The viewshed updating system can thus associate each viewshed with a numeric measure of strength.

The viewshed updating system 170 can then associate generated viewsheds to particular areas of a map and the lanes within those areas. The lanes can be represented by a road graph. In this specification, a road graph is data that represents routes that can be used for travel and navigation, e.g., vehicular travel routes. A road graph can include paths, e.g., arranged in a grid or a graph, that define areas on which vehicles are allowed to travel. For example, the paths defined by a road graph can define boundaries of vehicle routes, demarcations or centers of lanes of vehicle routes, and intersections, to name just a few examples. In order to associate viewshed areas to lanes, the system can use a representative location of the viewshed area and match that location to intersecting lanes in the road graph.

After associating the viewshed areas with lanes, the viewshed updating system 170 can match the traffic light that generated the viewshed to the lane associated with the viewshed. The viewshed updating system 170 can then store the association of the traffic light with the viewshed area in a viewshed map.

The sensor system 120 can store the generated viewshed map 175 in a viewshed map store 180. The server systems 120 can then serve the viewshed map 175 to vehicles in the fleet of self-driving vehicles in real world driving environments.

The vehicles can store the received viewshed map 175 in an on-board viewshed map store 140. The environment prediction system 130 can then use the viewshed map 145 in order to make predictions about when traffic lights have been detected.

In general, the environment prediction system 130 can determine that it is more likely that a traffic light has been detected when a sensor on board a vehicle is located within the viewshed volume or when the vehicle is located at least partially within a viewshed area as represented in the viewshed map 145.

Some of the environment predictions 135 generated by the environment prediction system 130 can also be used by an on-board planning system 150. For example, if a vehicle needs to see a traffic light to determine how to navigate a busy intersection, the on-board planning system 150 can deliberately cause the vehicle to remain within a viewshed of a traffic light in order to remain within view of the traffic light.

Figure 2:
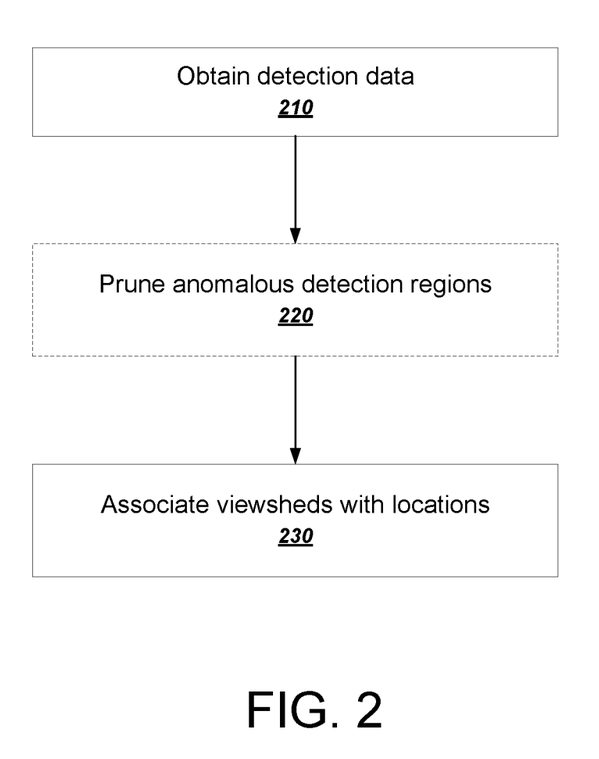
FIG. 2 is a flowchart of an example process for associating viewsheds with locations.

FIG. 2 is a flowchart of an example process for associating viewsheds with locations. For convenience, the process will be described as being performed by a system of one or more computers located in one or more locations. For example, a viewshed updating system, e.g., the viewshed updating system 170 depicted in FIG. 1, appropriately programmed in accordance with this specification, can perform the example process.

The system obtains detection data for an environment (210). As described above, detection data can include areas or locations from which particular traffic lights were detected by one or more sensors on one or more vehicles.

Each viewshed area can have an associated strength that can be based upon various factors as described above.

The system optionally prunes anomalous detections or anomalous detection regions (220). Some traffic lights might be associated with anomalous detections that form anomalous detection regions that are oddly shaped, oddly placed, or that are weakly supported. This can arise due to traffic lights being observed from anomalous angles that they were not intended to be viewed from, for example, in the reflection of a neighboring vehicle carrying a large mirror. This could also arise from an occlusion, e.g., a large truck blocking the view of a light in the center of its intended viewshed, which would be evidence to support cutting such anomalous detections or cutting a portion of the otherwise correct viewshed. Thus, the system can prune anomalous detections before associating the viewsheds with lanes in order to avoid generating anomalous detection regions.

Figure 3:
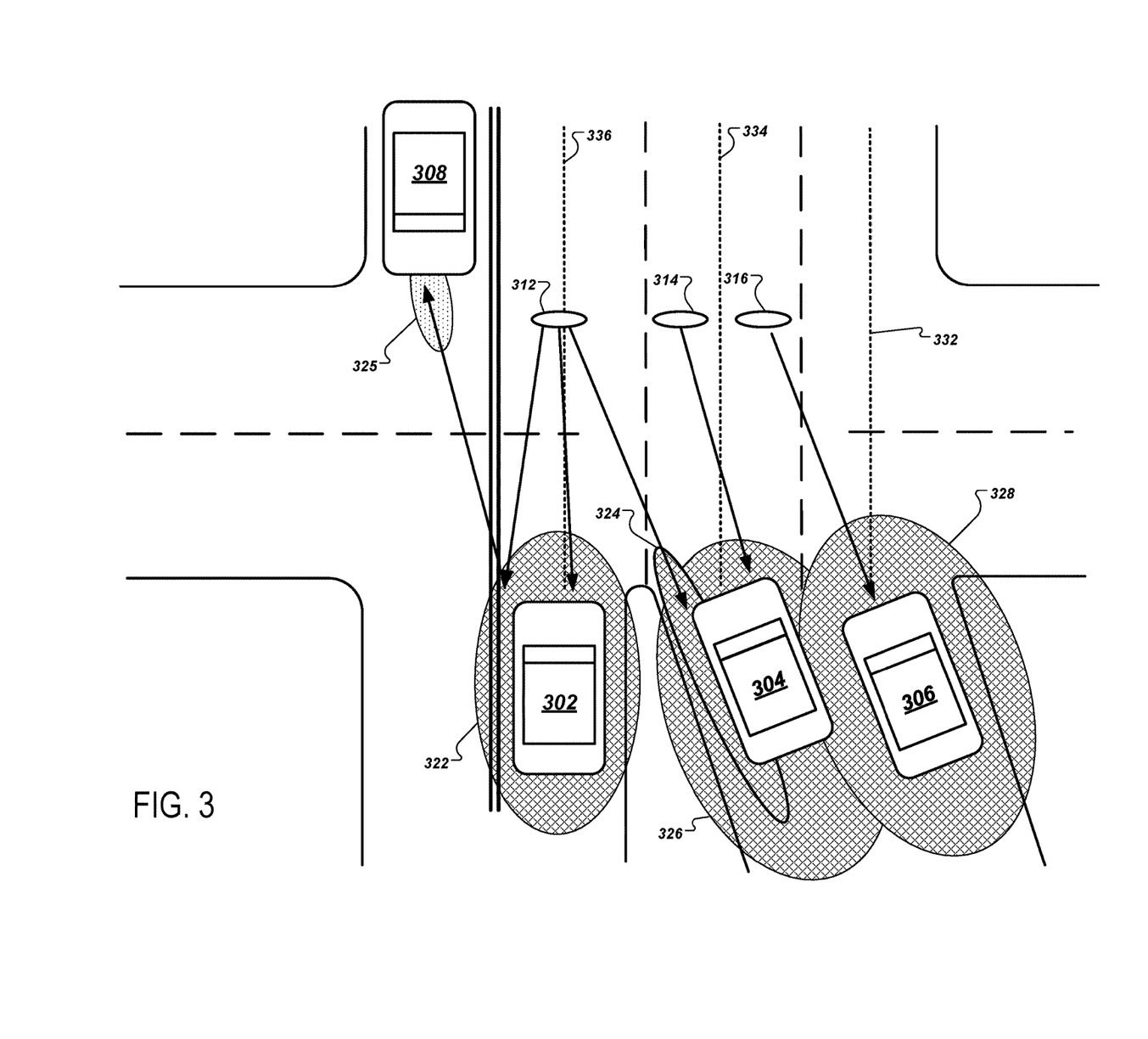
FIG. 3 illustrates viewsheds generated for traffic lights that control an irregular intersection.

FIG. 3 illustrates viewsheds generated for traffic lights that control an irregular intersection. In the example of FIG. 3, an oddly-shaped intersection includes a main road that merges with an off-ramp of a highway. Three vehicles 302, 304, and 306, are controlled by three traffic lights 312, 314, and 316. A fourth vehicle 308 is headed in an opposite direction to the vehicle 302, and thus is not expected to be able to detect any of the traffic lights 312, 314, and 316.

The three traffic lights 312, 314, and 316 generated strongly supported and regularly shaped viewsheds 322, 326, and 328. Because of the odd nature of the intersection, detections of the traffic light 312 also generated an thinner-shaped viewshed 324 from a different lane. As illustrated, the viewshed 324 is much thinner than the other view sheds and may also have a lower measure of strength than the other viewsheds. This example illustrates that a traffic light can have different viewsheds for different lanes, and might only be used to represent visibility of a traffic light from a lane rather than dictating which traffic lights are intended to control traffic in which lanes.

FIG. 3 also illustrates an anomalous detection region 325 that is associated with the traffic light 312 despite being at a location behind the traffic light and in a lane of oncoming traffic relative to the traffic that traffic light 312 is intended to control. As described above, the anomalous detection region 325 can arise due to reflections in the environment or false positive detections. Generally an anomalous detection region will have far fewer and far weaker detections than other detection regions used to generate a viewshed for a traffic light.

Therefore, the system can prune the anomalous detection region 325 from consideration before generating the viewshed area 322 for the traffic light 312. For example, the system can determine that a detection, or a cluster of detections, is too far away from any other detections or clusters of detection. Or the system can determine that a particular cluster of detections does not have a sufficient number of detections to be included in a viewshed for a traffic light. If either of these conditions are satisfied, the system can prune the anomalous detection region 325 from consideration before generating viewshed data for a particular traffic light.

As shown in FIG. 2, the system associates viewsheds with locations (230). In this context, a location can be a geographic location, a lane or a portion of a lane, or a particular portion of a road graph. In some implementations, the system associates a viewshed area for a viewshed with a particular geographic location and maintains data about its shape and size.

The system can alternatively or in addition associate a viewshed with other map features, such as lanes and portions of a road graph. For example, the system can compute a representative location of each view shed, and then determine which portion of a lane or a road graph intersects the representative location. The system can compute any appropriate representation of the location of the viewshed area, including a geometric center, a center of mass, or some other measure of centralness of a viewshed area.

As illustrated in FIG. 3, because traffic lights tend to be close together, the viewsheds are expected to have many overlapping regions. However by computing the representative locations of the viewsheds, the viewsheds can be distinguished by their representative locations. For example, although the viewshed 326 heavily intersects the viewshed 328, it is clear from the illustration that the centers of these oval shapes can be distinguished.

After associating viewsheds with locations, the system can use those locations when making driving decisions that use traffic light detections as inputs. Then, the system can condition the execution of particular driving plans based on a current location of the vehicle. If the location is within a viewshed, the system can execute the plan as proposed. But if not, the system can take some other action, including aborting or modifying the driving plan.

Figure 4:
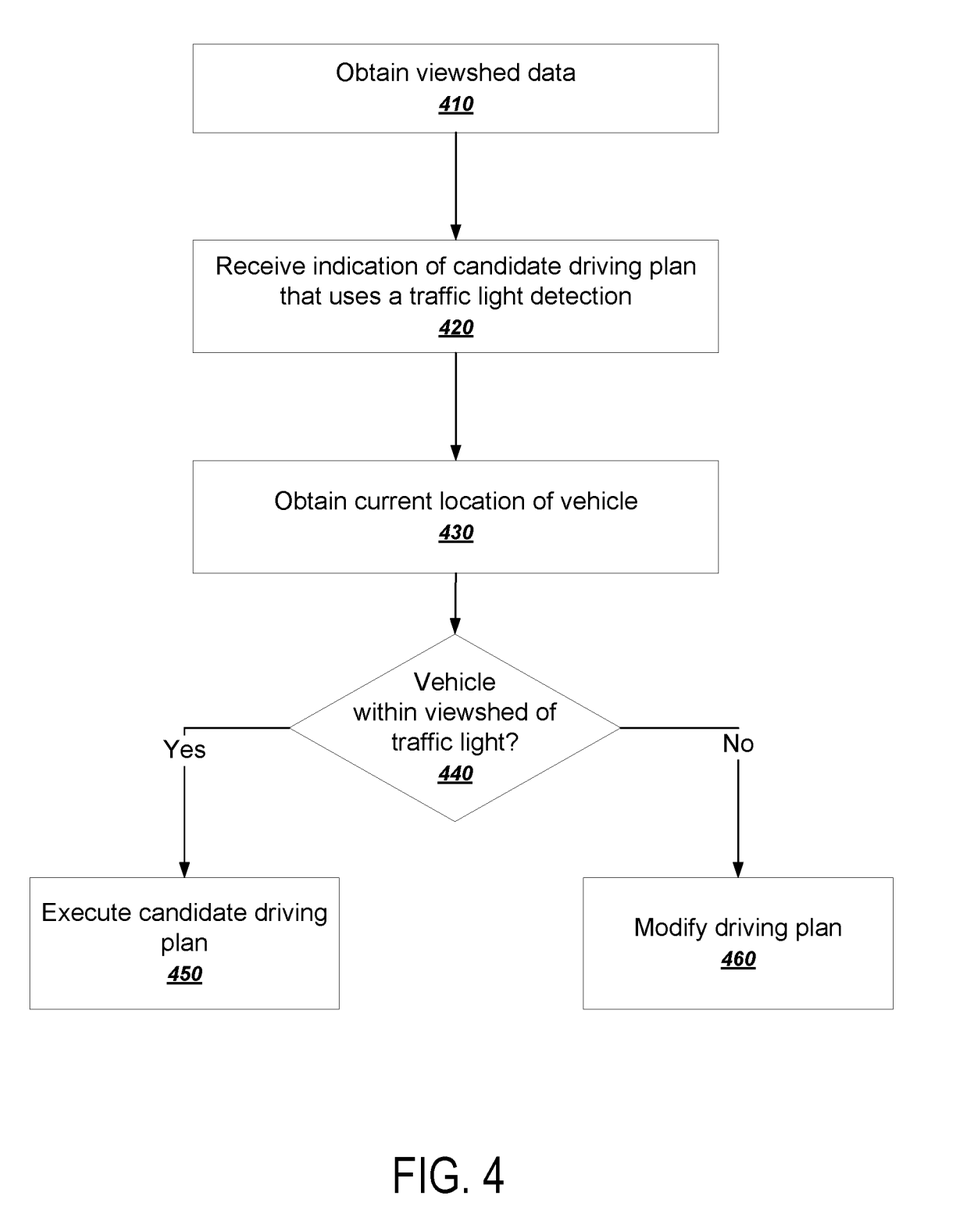
FIG. 4 is a flowchart of an example process of using a viewshed to make autonomous driving decisions.

FIG. 4 is a flowchart of an example process of using a viewshed to make autonomous driving decisions. For or convenience, the process will be described as being performed by a system of one or more computers located in one or more locations. For example, a viewshed updating system, e.g., the onboard-system 110 depicted in FIG. 1, appropriately programmed in accordance with this specification, can perform the example process.

The system obtains viewshed data (410). For example, the system can maintain an on-board viewshed map store that stores data about viewsheds for traffic lights.

The system receives an indication of a candidate driving plan that uses a traffic light detection (420). The candidate driving plan is a plan for the vehicle that takes as input a detection of a traffic light. For example, a candidate driving plan can be to enter an intersection as soon as a particular green traffic light is detected as turning on.

The system obtains a current location of the vehicle (430). The location of the vehicle can be represented in any appropriate way, for example, as a geographic location, a point within a lane, or as a point on a road graph.

The system determines whether the current location of the vehicle is within a viewshed of the traffic light (440). In order to determine whether or not a vehicle is considered to be within the viewshed volume, the on-board systems can use the viewshed maps in order to reconstruct a viewshed volume. In some implementations, the viewshed maps include data representing two-dimensional viewshed areas that can be used to reconstruct the three-dimensional viewshed volumes. By reconstructing the viewshed volume from the viewshed area 460, the system need not explicitly represent the viewshed volume 450.

The on-board system can then determine whether or not at least one sensor, or a particular sensor, is within the viewshed volume. As part of this process, the system can consider an offset of a sensor relative to a maintained pose of a vehicle that determines its current location. For example, if the pose of a vehicle within a viewshed area is determined by a position on an axle or the centroid of the vehicle or an axle, the on-board system can use the offset of a sensor on the top of the vehicle in order to accurately determine whether the sensor is also within the viewshed volume.

The system can then condition execution of the candidate driving plan based on whether or not the location of the vehicle is within the particular viewshed for the traffic light. Thus, if the vehicle is within the viewshed of the traffic light, the system executes the candidate driving plan (branch to 450). If not, the system modifies the driving plan (branch to 460). This process essentially allows the on-board system to condition execution of a candidate driving plan on whether or not the location of the vehicle is within a viewshed for the traffic light. Thus, it can serve as an extra safety check to determine whether a traffic light is to be trusted or whether a driving plan needs modification, which can eliminate false positive detections of traffic lights due to reflections or other light sources.

For example, if a passenger car is behind a commercial truck with brake lights that are relatively high off the ground, the red brake lights might appear directly on a line of sight between the passenger car's sensors and where a traffic light is expected to be. This situation might cause the on-board sensors to make a false positive identification of a traffic light when it is actually a red brake light that is being detected.

However, these kinds of false positives can be reduced by using viewsheds. For example, if a passenger car is outside of a viewshed area of a traffic light, the passenger car can reduce the likelihood of using a false positive detection as part of a driving plan, even when round red lights are detected. Viewsheds can also be used to modify or inform driving plans.

Figure 5:
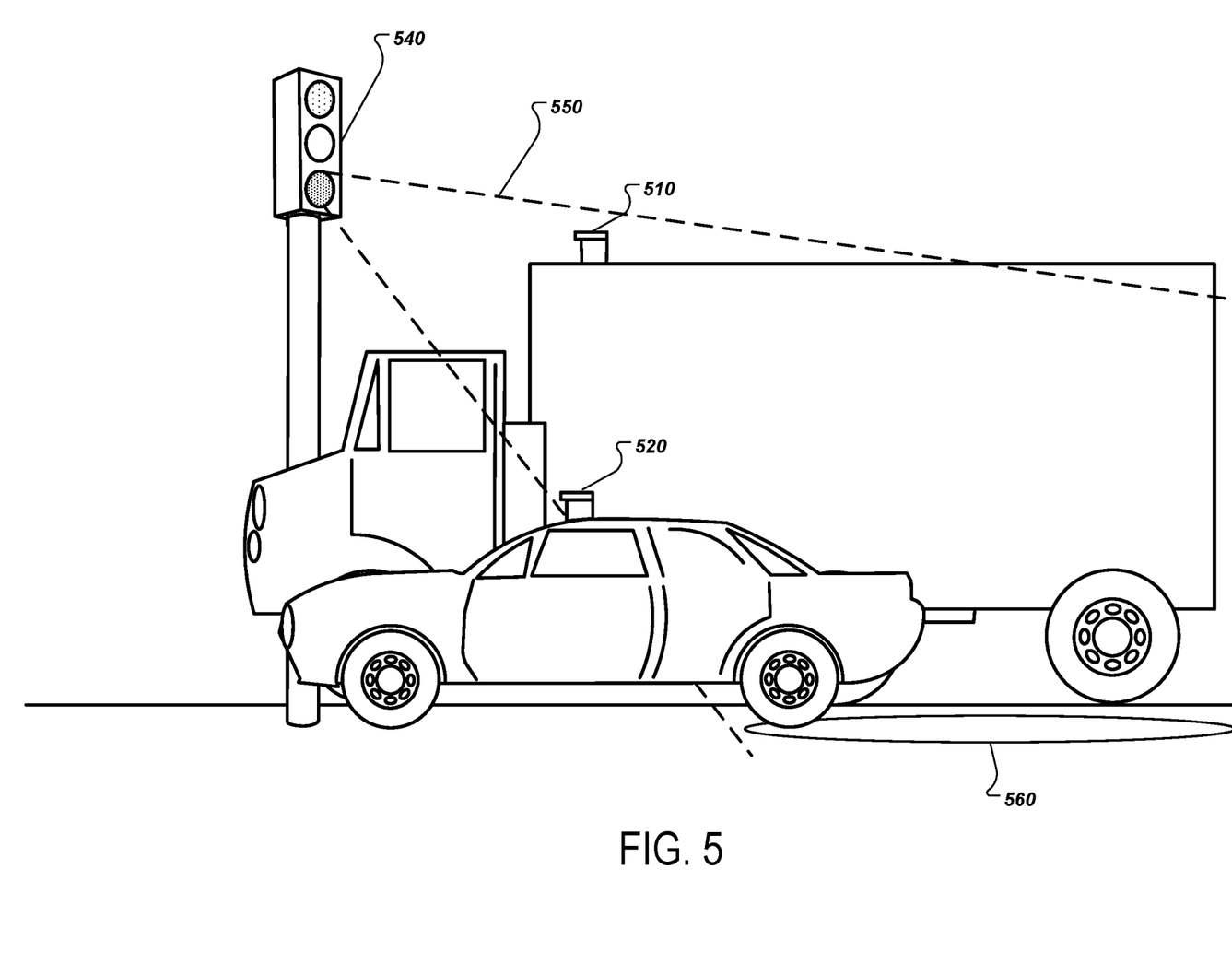
FIG. 5 illustrates an example of using a viewshed to determine where a vehicle should stop in an intersection.

FIG. 5 illustrates an example of using a viewshed to determine where a vehicle should stop in an intersection. In FIG. 5, a traffic light 540 has a viewshed volume 550 that, when it intersects with the road surface, creates a viewshed area 560, which can be represented in vehicles' on-board systems in a viewshed map.

FIG. 5 illustrates how the sensor pose can be taken into consideration when determining whether a vehicle is within a viewshed. In other words, even when located at the same distance from the traffic light 540 within the viewshed area 560, a sensor 520 on top of a passenger car will be within the viewshed volume 550, while a sensor 510 on top of a commercial truck will not be within the viewshed volume 550.

The system can use the viewshed 550 in order to modify a driving plan so that the vehicles remain in the viewshed for as long as the traffic light needs to be detected. One example situation where this occurs is when waiting for oncoming traffic to pass before making a left turn. The system can generate a driving plan that causes a vehicle to remain in a viewshed for a traffic light so that the vehicle can react accordingly if the light changes.

Thus, as shown in FIG. 5, the on-board systems of the commercial truck and the passenger vehicle might make different driving decisions. For example, the commercial truck can still pull forward some distance due to the location of the sensor 510 being higher off the roadway. On the other hand, the on-board system for the passenger car can generate a driving plan that stops forward progress of the passenger car at its current location in order to keep the sensor 520 within the viewshed volume 550 of the traffic light 540.

Viewshed areas can also be used for a number of other driving decisions. As one example, a viewshed area can be used to inform the navigation system in the face of traffic light deviations. For example, if a construction crew overnight performs work on a traffic light installation that moves a traffic light a certain distance, e.g., one foot, to the left of where it was previously located, an onboard system of a vehicle might assign a smaller measure of confidence in the new location of the traffic light as well as a correspondingly smaller measure of confidence that the traffic light should be followed.

However, if the onboard system determines that the vehicle is within the viewshed area of the old traffic light in a particular lane, the vehicle can use that fact to as evidence in determining whether the new traffic light should be followed when in the particular lane. In other words, the fact that the vehicle was located in the viewshed area of the old traffic light can be used as further evidence that the lane is governed by a traffic light.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
- obtaining, by an on-board computer system of vehicle, viewshed data comprising a plurality of viewsheds for a plurality of respective traffic lights, each viewshed being generated from sensor detections of traffic lights by one or more vehicles;
- receiving an indication of a candidate driving plan based on input from a traffic light detection of a particular traffic light, wherein the particular traffic light is associated with a particular viewshed of the plurality of viewsheds;
- obtaining a current location of the vehicle;
- determining whether the current location of the vehicle is within the particular viewshed for the particular traffic light; and
- conditioning execution of the candidate driving plan based on whether the current location of the vehicle is within the particular viewshed for the particular traffic light.

Embodiment 2 is the method of embodiment 1, wherein conditioning execution of the candidate driving plan based on whether the current location of the vehicle is within the particular viewshed for the particular traffic light comprises:
  determining that the current location of the vehicle is not within the particular viewshed for the particular traffic light; and
  in response, selecting an alternative driving plan instead of the candidate driving plan.

Embodiment 3 is the method of any one of embodiments 1-2, wherein conditioning execution of the candidate driving plan based on whether the current location of the vehicle is within the particular viewshed for the particular traffic light comprises:
  executing the candidate driving plan if and only if the current location of the vehicle is within the particular viewshed for the particular traffic light.

Embodiment 4 is the method of any one of embodiments 1-3, wherein determining whether the current location of the vehicle is within the particular viewshed for the particular traffic light comprises determining that a sensor of the vehicle is within a three-dimensional volume of the viewshed or determining that the vehicle is within a two-dimensional viewshed area defined by an intersection of the three-dimensional volume with a road surface.

Embodiment 5 is the method of any one of embodiments 1-4, further comprising generating a modified candidate driving plan that causes the vehicle to remain within the viewshed of the particular traffic light.

Embodiment 6 is the method of embodiment 5, wherein the modified candidate driving plan stops forward progress of the vehicle so that the vehicle remains within the viewshed of the particular traffic light.

Embodiment 7 is the method of embodiment 6, wherein the modified candidate driving plan stops forward progress of the vehicle so that the vehicle remains within the viewshed of the particular traffic light until oncoming traffic has passed during a turn.

Embodiment 8 is the method of any one of embodiments 1-7, further comprising:
  obtaining detection data representing locations from which a plurality of traffic lights were detected;
  generating, for each traffic light of the plurality of traffic lights, respective viewsheds using the locations from which the plurality of traffic lights were detected.

Embodiment 9 is the method of embodiment 8, further comprising associating each generated viewshed with a respective location.

Embodiment 10 is the method of embodiment 9, wherein the respective location represents a geographic location, a portion of a lane, or a portion of a road graph.

Embodiment 11 is the method of embodiment 8, further comprising:
  determining that for a traffic light having a plurality of detection regions that a particular detection region is an anomalous viewshed detection region; and
  in response, generating a viewshed for the traffic light that excludes the anomalous viewshed detection region.

Embodiment 12 is the method of any one of embodiments 1-11, wherein determining whether the current location of the vehicle is within the particular viewshed for the particular traffic light comprises computing an offset between a pose of the vehicle and the sensor.

Embodiment 13 is a system comprising: one or more computers and one or more storage devices storing instructions that are operable, when executed by the one or more computers, to cause the one or more computers to perform the method of any one of embodiments 1 to 12.

Embodiment 14 is a computer storage medium encoded with a computer program, the program comprising instructions that are operable, when executed by data processing apparatus, to cause the data processing apparatus to perform the method of any one of embodiments 1 to 12.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
  obtaining, by an on-board computer system of vehicle, viewshed data comprising a plurality of viewsheds for a plurality of respective traffic lights, each viewshed being generated from sensor detections of traffic lights by one or more vehicles, wherein each viewshed defines a three-dimensional volume for a respective traffic light;
  receiving an indication of a candidate driving plan based on input from a traffic light detection of a particular traffic light, wherein the particular traffic light is associated with a particular viewshed of the plurality of viewsheds;
  obtaining a current pose of the vehicle representing a location of the vehicle;
  computing a sensor position of a sensor relative to the pose of the vehicle;
  and
  generating, by the on-board computer system of the vehicle, a modified driving plan that causes the vehicle to move such that the sensor position enters the three-dimensional volume defined by the particular viewshed for the particular traffic light; and executing the modified driving plan and continuing to execute the modified driving plan while the sensor position of the vehicle is within the three-dimensional volume defined by the particular viewshed for the particular traffic light.

2. The method of claim 1, further comprising:
determining that the sensor position is not within the three-dimensional volume defined by the particular viewshed for the particular traffic light; and
generating the modified driving plan in response.

3. The method of claim 2, wherein determining that the sensor position is not within the volume defined by the particular viewshed comprises determining that the vehicle is not within a two-dimensional viewshed area defined by an intersection of the three-dimensional volume with a road surface.

4. The method of claim 1, further comprising generating a second modified candidate driving plan that causes the sensor position of the vehicle to remain within the volume defined by the particular viewshed of the particular traffic light.

5. The method of claim 1, wherein the modified driving plan stops forward progress of the vehicle so that the sensor position of the vehicle remains within the volume defined by the particular viewshed of the particular traffic light.

6. The method of claim 5, wherein the modified driving plan stops forward progress of the vehicle so that the sensor position of the vehicle remains within the volume defined by the particular viewshed of the particular traffic light until oncoming traffic has passed during a turn.

7. The method of claim 1, further comprising:
obtaining detection data representing locations from which a plurality of traffic lights were detected; and
generating, for each traffic light of the plurality of traffic lights, respective viewsheds using the locations from which the plurality of traffic lights were detected.

8. The method of claim 7, further comprising associating each generated viewshed with a respective location.

9. The method of claim 8, wherein the respective location represents a geographic location, a portion of a lane, or a portion of a road graph.

10. The method of claim 7, further comprising:
determining that for a traffic light having a plurality of detection regions that a particular detection region is an anomalous viewshed detection region; and
in response, generating a viewshed for the traffic light that excludes the anomalous viewshed detection region.

11. The method of claim 1, wherein computing a sensor position of a sensor relative to the pose of the vehicle comprises computing an offset between the pose of the vehicle and the sensor.

12. A system comprising:
one or more computers and one or more storage devices storing instructions that are operable, when executed by the one or more computers, to cause the one or more computers to perform operations comprising:
obtaining, by an on-board computer system of vehicle, viewshed data comprising a plurality of viewsheds for a plurality of respective traffic lights, each viewshed being generated from sensor detections of traffic lights by one or more vehicles, wherein each viewshed defines a three-dimensional volume for a respective traffic light;
receiving an indication of a candidate driving plan based on input from a traffic light detection of a particular traffic light, wherein the particular traffic light is associated with a particular viewshed of the plurality of viewsheds;
obtaining a current pose of the vehicle representing a location of the vehicle;
computing a sensor position of a sensor relative to the pose of the vehicle;
and
generating, by the on-board computer system of the vehicle, a modified driving plan that causes the vehicle to move such that the sensor position enters the three-dimensional volume defined by the particular viewshed for the particular traffic light; and
executing the modified driving plan and continuing to execute the modified driving plan while the sensor position of the vehicle is within the three-dimensional volume defined by the particular viewshed for the particular traffic light.

13. The system of claim 12, wherein the operations further comprise:
determining that the sensor position is not within the three-dimensional volume defined by the particular viewshed for the particular traffic light; and
generating the modified driving plan in response.

14. The system of claim 12, wherein determining that the sensor position is not within the volume defined by the particular viewshed comprises determining that the vehicle is not within a two-dimensional viewshed area defined by an intersection of the three-dimensional volume with a road surface.

15. The system of claim 12, wherein the operations further comprise generating a second modified candidate driving plan that causes the sensor position of the vehicle to remain within the volume defined by the particular viewshed of the particular traffic light.

16. The system of claim 15, wherein the modified driving plan stops forward progress of the vehicle so that the sensor position of the vehicle remains within the volume defined by the particular viewshed of the particular traffic light.

17. The system of claim 16, wherein the modified driving plan stops forward progress of the vehicle so that the sensor position of the vehicle remains within the volume defined by the particular viewshed of the particular traffic light until oncoming traffic has passed during a turn.

18. One or more non-transitory computer storage media encoded with computer program instructions that when executed by one or more computers cause the one or more computers to perform operations comprising:
obtaining, by an on-board computer system of vehicle, viewshed data comprising a plurality of viewsheds for a plurality of respective traffic lights, each viewshed being generated from sensor detections of traffic lights by one or more vehicles, wherein each viewshed defines a three-dimensional volume for a respective traffic light;
receiving an indication of a candidate driving plan based on input from a traffic light detection of a particular traffic light, wherein the particular traffic light is associated with a particular viewshed of the plurality of viewsheds;
obtaining a current pose of the vehicle representing a location of the vehicle;
computing a sensor position of a sensor relative to the pose of the vehicle;
and generating, by the on-board computer system of the vehicle, a modified driving plan that causes the vehicle to move such that the sensor position enters the three-dimensional volume defined by the particular viewshed for the particular traffic light; and executing the modified driving plan and continuing to execute the modified driving plan while the sensor position of the vehicle is within the three-dimensional volume defined by the particular viewshed for the particular traffic light.

\* \* \* \* \*